United States Patent [19]

Kanda

[11] Patent Number: 4,820,035
[45] Date of Patent: Apr. 11, 1989

[54] COLLAPSIBLE SPECTACLES

[75] Inventor: Kouji Kanda, Osaka, Japan

[73] Assignee: Kanda Optical Co., Ltd., Japan

[21] Appl. No.: 708,101

[22] Filed: Feb. 28, 1985

Related U.S. Application Data

[63] Continuation of Ser. No. 596,505, Apr. 3, 1984, abandoned, which is a continuation of Ser. No. 325,437, Nov. 6, 1981, abandoned.

[30] Foreign Application Priority Data

Aug. 1, 1980 [JP] Japan ................................ 55-109910

[51] Int. Cl.⁴ ............................................. G02C 5/22
[52] U.S. Cl. .................................. 351/153; 351/113; 351/128
[58] Field of Search ............... 351/153, 111, 123, 128, 351/113; 206/5, 6

[56] References Cited

U.S. PATENT DOCUMENTS 2,389,428  11/1945  Glasser ................................ 351/128
3,586,425   6/1971  Gilman ................................ 351/113
3,880,503   4/1975  Uribe ................................... 351/60

FOREIGN PATENT DOCUMENTS 177728 of 1973 Japan .

Primary Examiner—Rodney B. Bovernick
Assistant Examiner—P. M. Dzierzynski
Attorney, Agent, or Firm—Pravel, Gambrell, Hewitt, Kimball & Krieger

[57] ABSTRACT

The invention provides spectacles in which the distance between two lens frames (1)(2) is variable and which has holders (7)(7a) on the lens frame, a bridge (8) slidably fitted in the holder for connecting the lens frames together and holding means (9) for determining the effective length of the bridge.

2 Claims, 3 Drawing Sheets

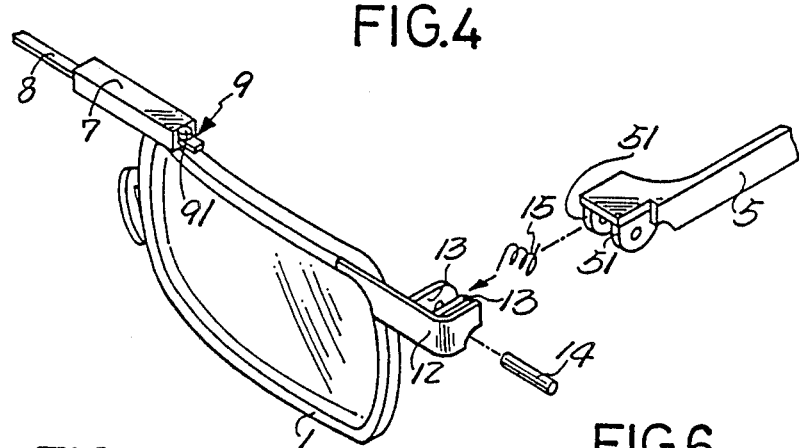
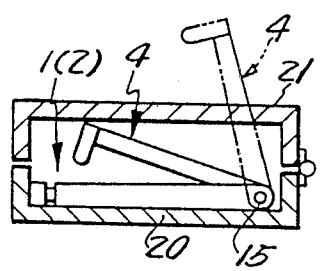
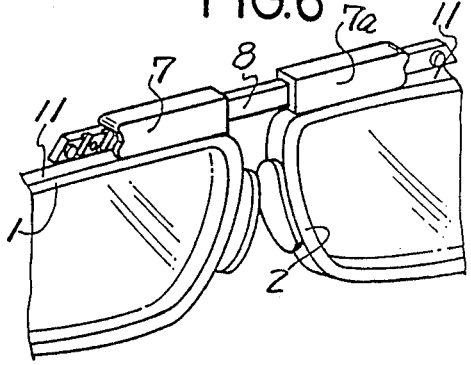
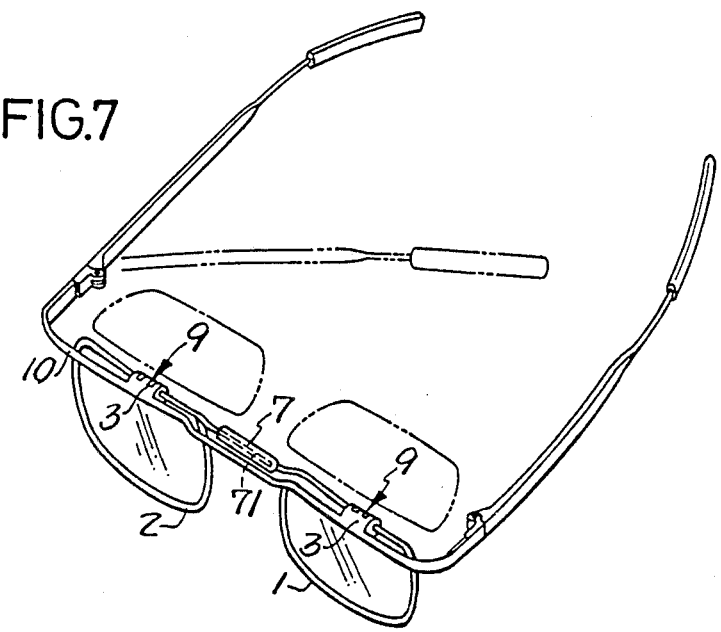

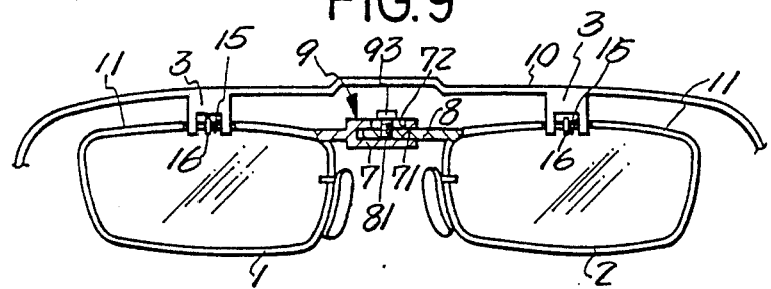
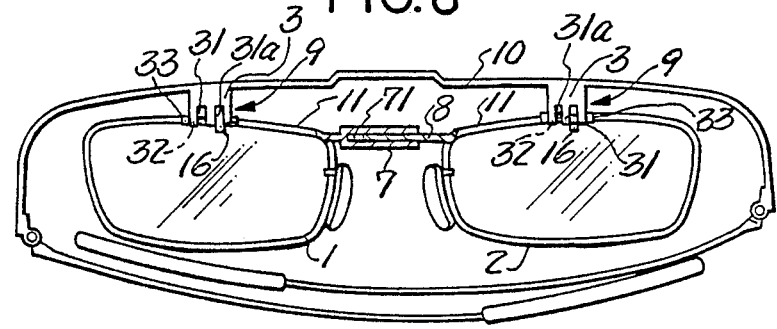
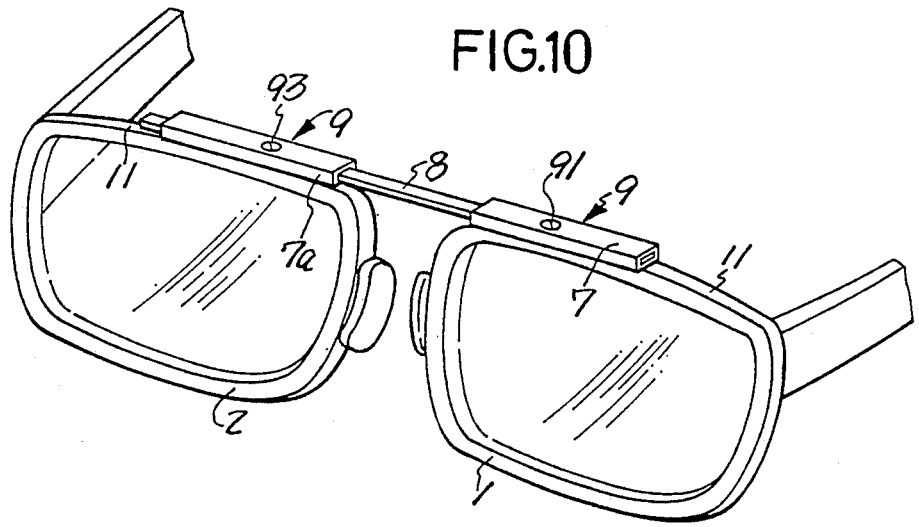

COLLAPSIBLE SPECTACLES

This is a continuation of co-pending application Ser. No. 596,505 filed 4-3-1984 which is a continuation of application Ser. No. 325,437 filed Nov. 6, 1981, both now abandoned.

TECHNICAL FIELD

The present invention relates to spectacles in which the space between the lens frames can be reduced.

BACKGROUND ART

Conventionally the spectacle frame is made integral with the lens frames, and the distance between the opposite lens frames is not variable.

When suitable spectacles are to be prepared, a spectacle frame is selected in accordance with the width of the face first, and the lenses are cut in conformity with the shape of the lens frames. If the lenses are cut so as to be in alignment with the pupils when the distance between the pupils is excessively large or small relative to the width of the face, the lens, if having a small effective diameter, will include in its inward or outward portion a mere glass portion which fails to function as a lens, consequently giving rise to the problem of causing fatigue to the eyes of the wearer.

To overcome this problem, another problem arises in that there is the need to specifically select and cut lenses having a larger effective diameter.

DISCLOSURE OF THE INVENTION

According to the present invention, a holder on the lens frame has a bridge slidably fitted therein and is provided with holding means for determining the effective length of the bridge, whereby the distance between the lens frames can be determined in accordance with the distance between the pupils of the wearer.

It is therefore possible to select spectacles which are best suited to the pupil-to-pupil distance of the wearer without the necessity of cutting lenses of large effective diameter.

Further since the distance between the lens frames can be reduced when the spectacles are carried about, the spectacles are convenient to wear and carry and have useful features.

BRIEF DESCRIPTION OF THE DRAWINGS

FIG. 4 is an exploded view showing the hinge portion of a temple;

FIG. 5 is a sectional view of the spectacles as placed in a case;

FIG. 6 is a perspective view of another embodiment in which the bridge is in a different position;

FIG. 7 is a perspective view of another embodiment comprising lens frames pivoted to the main frame of spectacles;

FIG. 8 is a front view of the spectacles of FIG. 7 to show the bridge portion thereof in section;

FIG. 9 is a front view showing another embodiment of holding means; and

FIG. 10 is a perspective view showing other embodiments of the bridge and holding means.

BEST MODE OF CARRYING OUT THE INVENTION

Figure 1:
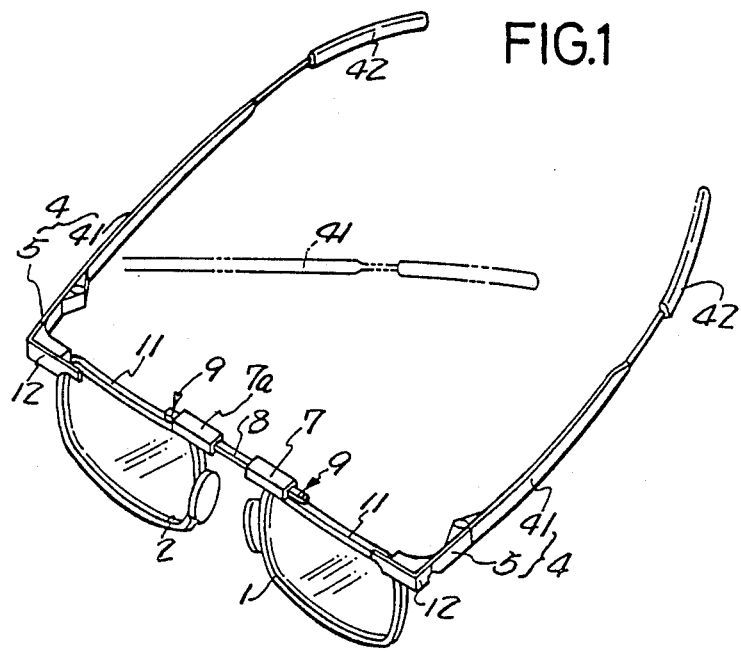
FIG. 1 is a perspective view showing spectacles according to the invention.

Spectacles comprise a pair of lens frames 1, 2 connected together by a bridge 8 which is characteristic of the present invention. Temples 4, 4 are foldably attached to support members 12 projecting from the outer ends of upper sides 11 of the lens frames 1, 2.

The temple 4 comprises an auxiliary segment 5 having a length corresponding to the vertical width of the lens frames 1, 2 and a temple main body 41 having an ear engaging portion 42. As seen in FIG. 4, bearing lugs 13, 13 on the inner side of the support member 12 are fitted in between attaching lugs 51, 51 on the base end of the auxiliary temple segment 5, and the segment is pivoted to the member 12 by a pin 14, whereby the segment is made foldable in a plane perpendicular to the lens frames 1, 2.

The pin 14 carries a torsion spring 15 which biases the auxiliary temple segment 5 toward its unfolded position.

The temple main body 41 is hinged to the free end of the auxiliary temple segment 5 so as to be foldable in a plane perpendicular to the plane of turn of the segment 5.

Figure 2:
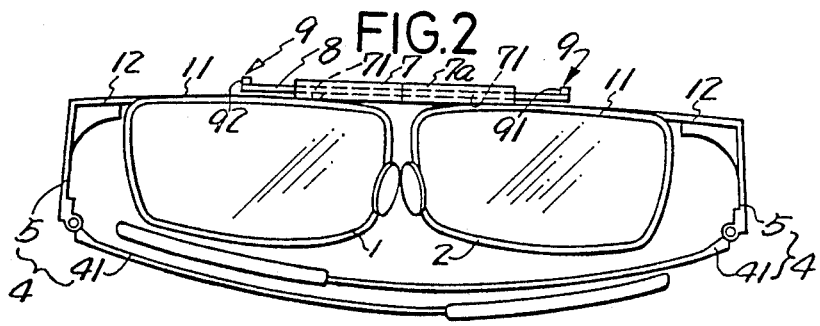
FIG. 2 is a front view showing the same in a folded state.

Accordingly the temples 4 are foldable without lapping over the lens frames 1, 2 to collapse the spectacles to a flat shape as seen in FIG. 2.

The upper sides 11, 11 of the lens frames 1, 2 are provided with holders 7, 7a in alignment with each other and each having a guide channel 71. The bridge 8 slidably extends through the guide channels 71.

The bridge 8 is in the form of a metal strip and is disposed with its planar surface in parallel to the upper sides 11, 11 of the lens frames. Alternatively, the planar surface is perpendicular to the upper side 11 of the lens frame as seen in FIG. 6.

Figure 3:
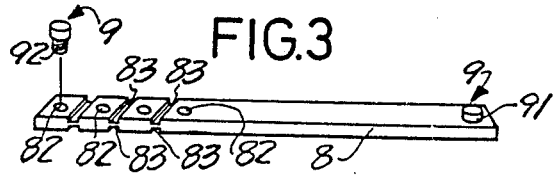
FIG. 3 is a perspective view showing a bridge.

As shown in FIG. 3, the bridge 8 has a fixing screw 91 screwed in one end and a plurality of screw holes 82 formed in the other end and aligned at spacing of about 3 mm. Cutout grooves 83, 83 are formed in the opposite sides of the bridge between the screw holes 82, 82. When the lens frames are adjusted to the pupil-to-pupil distance, an excess length of the bridge 8 is snapped off at a grooved portion.

An adjusting screw 92 is screwed in a screw hole 82 at the proper position in accordance with the distance between the pupils. The end screws 91, 92 serve as holding means 9 for preventing the bridge 8 from slipping off, i.e. for determining the maximum effective length of the bridge 8.

When the distance between the lens frames 1, 2 does not correspond to the pupil-to-pupil distance of a wearer to whom the spectacles are to be matched, the adjusting screw 92 is removed, and the bridge 8 is moved toward or away from the holder 7 to optimally adjust the distance between the lens frames 1, 2. The adjusting screw 92 is then screwed in the corresponding hole 82 at the outer end of the holder 7. The excessive portion of the bridge 8 is broken off.

When the lens frames 1, 2 so arranged are moved away from each other on the bridge 8 until the end screws 91, 92, namely the holding means 9, 9, strike the outer ends of the holders 7, 7a the distance between the lens frames 1, 2 always corresponds to the pupil-to-pupil distance. The spectacles then will not fatigue the eyes.

When the spectacles are collapsed to the smallest size along the bridge 8 and placed into a case 20, and the lid 21 is closed as shown in FIG. 5, the lens frames 1, 2 and the temples 4 are all arranged in the same plane as indicated in broken lines. Thus the spectacles are foldable to a flat shape and convenient to carry.

Further when the lid 21 is opened, the torsion springs 15 act to raise the temples 4, 4 to an intersecting position. The spectacles are therefore convenient to take out.

If the planar surface of the bridge 8, as seen in FIG. 1, is in parallel to the upper sides 11, 11 of the lens frames, the bridge 8 involves reduced sliding resistance and is smoothly slidable through the holders 7, 7a when the spectacles are collapsed or stretched along the bridge 8.

Further as shown in FIG. 10, the base end of the bridge 8 may be fitted in one of the holders and secured thereto with the screw 91 or by spot welding, adhesive or the like, and the forward end of the bridge slidably fitted in the other holder 7a. After the distance between the lens frames 1, 2 has been adjusted optimally, the forward end can be fixed to the holder 7a with a clamp bolt 93.

FIGS. 7 and 8 show another embodiment comprising a main spectacle frame 10 and lens frames 1, 2 attached thereto. A holder 7 having a guide channel 71 extends from the lens frame 1, and a bridge 8 extends from the other lens frame 2. The holder 7 and the bridge 8 are slidably fitted together to render the length of the bridging portion adjustable.

In order to hinge the lens frames 1, 2 to the main rame 10 with the frames 1, 2 spaced apart by an adjustable distance, the upper sides 11 of the lens frames 1, 2 are provided with supporting pieces 16, 16 at inner midportions thereof, while the main frame 10 has bearing portions 3, 3 on the inner side thereof, each of the support pieces 16, 16 being fitted in selected one of cutout grooves 31, 31a formed in the forward edge of the corresponding bearing portion 3, whereby holding means 9 is provided for adjusting the length of the bridging portion.

The cutout grooves 31, 31a have a width corresponding to the thickness of the support piece 16. In the present embodiment, two grooves 31 are formed at a pitch of 1.5 mm in each of the bearing portions 3, 3.

The bearing portion 3 is formed at a location closer toward its forward end with a pin bore 32 along the main frame 10. The pin bore 32 is threaded at one end (not shown).

With the support piece 16 of each of the lens frame 1, 2 fitted in one of the grooves 31, 31a, a pin 33 having a threaded end is screwed into the pin bore 32 to turnably attach the support piece 16 to the bearing portion 3.

The distance between the lens frames 1, 2 is adjustable by removing the pin 33, connecting the support piece 16 to the bearing portion of the main frame 10, from one or each of the lens frames 1, 2, and fitting the support piece 16 to the other adjacent groove.

With the present embodiment, two grooves 31, 31a are formed at a pitch of 1.5 mm in each of the bearing portions 3, 3, so that according to the user, the support pieces may be both fitted in the outer grooves 31 of the bearing portions 3, 3, or one of the support piece may be fitted in the outer groove 31 of one portion and the other support piece in the inner groove 31a of the other portion, or both the support pieces may be fitted in the inner grooves 31a. Thus the distance between the two lens frames 1, 2 is adjustable in three ways with an increment or decrement of 1.5 mm in accordance with the distance between the pupils.

In the above embodiment of the invention, the frame-to-frame distance is similarly adjustable when the bearing portions 3 are formed on the lens frames 1, 2, with the support pieces 16 provided on the main frame 10.

FIG. 9 shows another embodiment of the holding means 9 for determining the effective length of the bridge 8. A holder 7 having a slit 72 extends from one lens frame 1, while a bridge 8 extending from the other lens frame 2 has a threaded hole 81. A clamp bolt 93 slidably extending through the slit 72 is screwed in the threaded hole 81 to give a desired length to the bridging portion.

The spectacle main frame 10 has bearing portions 3 each formed with a cutout portion in which a support piece 16 on each of the lens frames 1, 2, is shiftably fittable. The support piece 16 is pivotably supported by a pin 33 in the cutout portion.

The pins 33 each have a torsion spring 15 wound thereon for biasing the lens frames 1, 2 toward an unfolding direction.

When the above embodiment is folded and placed in a case 20 as shown in FIG. 5, the temples 4 rise on opening the lid 21 for withdrawal. It is therefore convenient to take out.

Industrial Applicability

The spectacles of this invention are useful as those in which the center-to-center distance between the lenses is easily adjustable to the pupil-to-pupil distance.

I claim:

1. Collapsible glasses which are foldable to a flat shape fittable into a carrying case and easily removable from the case, said glasses comprising two lens frames provided with temples and connected together by a bridge extending from an upper side of one lens frame and being slidably engaged with an upper side of the other lens frame to render one lens frame movable toward or away from the other, characterized in that the bridge permits said lens frames to both be moved towards each other to a near position for folding and storage in the carrying case and also be moved away to a distant position for the wearer;

each of said temples further comprising:
an auxiliary temple segment pivotally hinged at its end portion to an upper side of the lens frame for rotation in a plane perpendicular to and from the plane of said lens frames to the flat shape for storage in the case;
a temple main body hinged to the other end of said auxiliary temple segment, thereby permitting rotation of said temple main body in a plane perpendicular to the plane of rotation of said auxiliary temple segment, to and from the flat shape when the case is open; and
biasing means between said auxiliary temple segment and said lens frames for biasing said auxiliary temple segment toward the plane perpendicular to the plane of said lens frames and out of the case when the case is opened.

2. The spectacles as defined in claim 1 wherein said biasing means comprises a torsion spring.

* * * * *